United States Patent [19]

Carlin, Jr.

[11] Patent Number: 4,699,294

[45] Date of Patent: Oct. 13, 1987

[54] APPARATUS FOR MAKING A POLYOLEFIN TANK WITHIN A METALLIC TANK

[75] Inventor: Hervin A. Carlin, Jr., Lake Charles, La.

[73] Assignees: Poly Processing Company, Inc., Monroe; Industrial Equipment & Engineering, Inc., Lake Charles, both of La.

[21] Appl. No.: 888,404

[22] Filed: Jul. 23, 1986

Related U.S. Application Data

[60] Division of Ser. No. 724,418, Apr. 18, 1985, Pat. No. 4,625,892, which is a continuation-in-part of Ser. No. 532,010, Sep. 14, 1983, abandoned.

[51] Int. Cl.4 .................. B65D 90/04; B65D 53/00; B65D 41/16
[52] U.S. Cl. ............................. 220/465; 220/319; 220/85 P
[58] Field of Search ............. 220/319, 320, 465, 85 P

[56] References Cited

U.S. PATENT DOCUMENTS

| 2,294,922 | 9/1942 | Malluk | 220/319 |
| 2,801,764 | 8/1957 | Russell | 220/320 |
| 4,253,583 | 3/1981 | Lynch | 220/319 |
| 4,254,888 | 3/1981 | Chandler | 220/85 P |
| 4,301,828 | 11/1981 | Martin | 220/85 P |
| 4,457,445 | 7/1984 | Hanks | 220/319 |

Primary Examiner—George E. Lowrance
Attorney, Agent, or Firm—Brady, O'Boyle & Gates

[57] ABSTRACT

Apparatus for making a polyolefin tank within a metallic tank wherein fixtures are attached to the flanges of the fittings of the metallic tank to allow the polyolefin to flow through the tank fittings, while the metallic tank is mounted in a rotational molding apparatus, whereby the outer surfaces of the tank flanges are coated with polyolefin.

4 Claims, 10 Drawing Figures

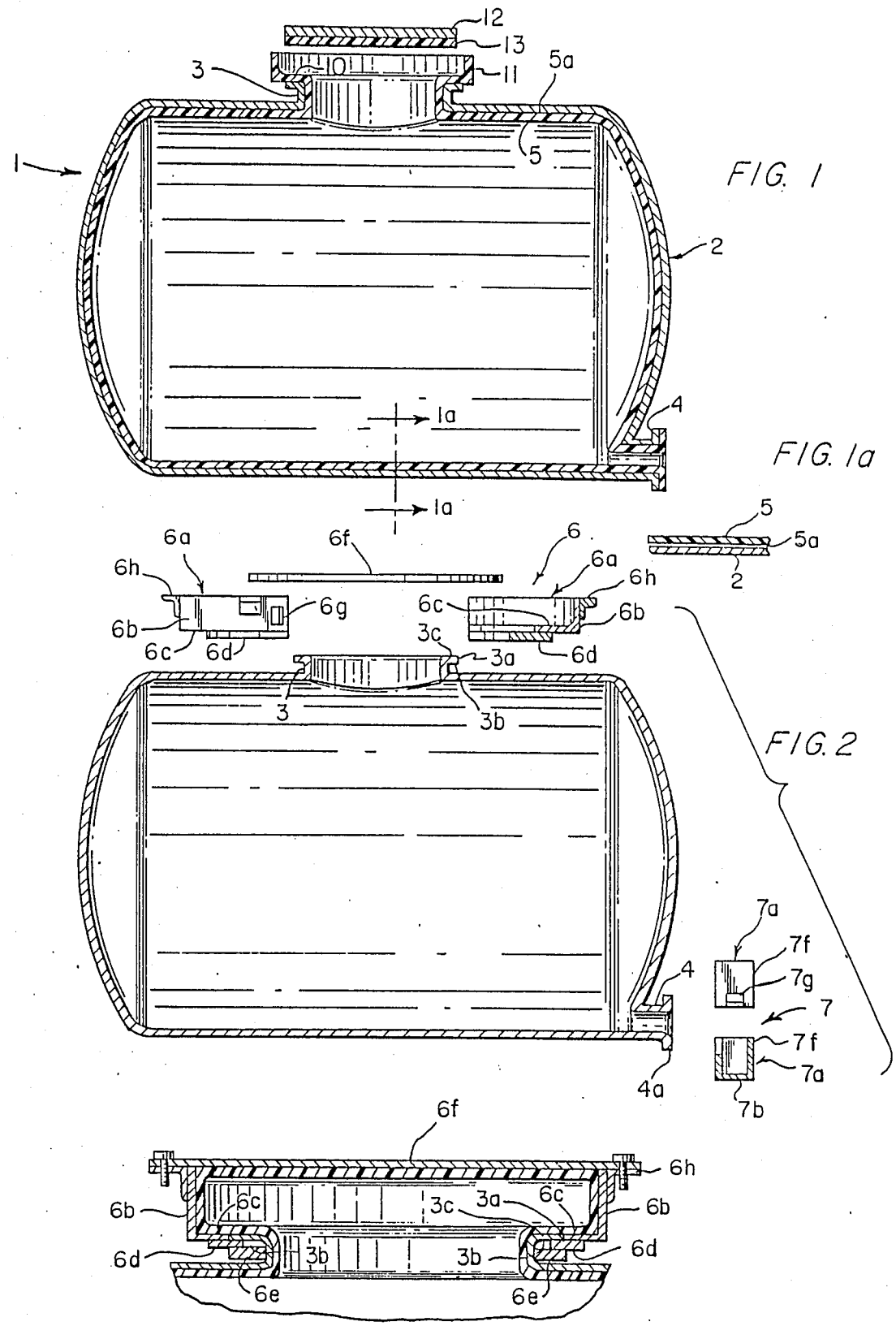

APPARATUS FOR MAKING A POLYOLEFIN TANK WITHIN A METALLIC TANK

REFERENCE TO RELATED APPLICATION

This is a division of application Ser. No. 724,418 filed March 18, 1985 now U.S. Pat. No. 4,625,892 issues Dec. 2, 1986.

Which application is a continuation-in-part of application Ser. No. 532,010, filed Sept. 14, 1983, now abandoned, entitled A POLYOLEFIN TANK WITHIN A METALLIC TANK, AND THE METHOD AND APPARATUS FOR MAKING SAME, and assigned to the same assignees as the instant invention

BACKGROUND OF THE INVENTION

Tanks employed for the transportation of bulk chemicals, usually in liquid form, are required to meet various safety standards established by federal, state and local governments to protect the population and/or environment from any inherent hazards caused by leakage of the chemicals from the tanks. Frequently, the chemicals are required to be transported at a pressure above or below atmospheric. Heretofore, metallic tanks have been employed to meet the requirements of pressure capability as well as handling, such as stacking, loading, potential mechanical abuse, availability of approved materials and standard approved fittings, and economy. However, material which reacts chemically with metals naturally presents problems when transported in metal tanks, resulting in corroded tanks which might develop into dangerous leaks, and sometimes ruinous alteration of the chemical being transported.

Transportation of these chemicals in polyolefin tanks may eliminate the problem of chemical reaction with the tank but the inherent lack of mechanical strength of a polyolefin tank makes it undesirable from an economic and safety viewpoint.

In order to obtain the advantages of both metallic and plastic tanks, it has been proposed to line the inside of a metallic tank with a plastic or other material which is compatible with the chemical to be transported. These lined tanks usually consist of a lining of plastic materials either adhered to the inside surface of the metallic tank, or inserted into the metallic tank in the form of a thin, flexible bladder.

In tanks having the plastic lining adhered to the interior surface thereof, the plastic is applied by spraying or securing a laminate plastic material to the tank wall by a suitable bonding agent resulting in a lining having seams, joints, and a nonuniform thickness. Unless a highly skilled workman is employed to apply the plastic liner to the tank, voids and pinholes occur in the liner resulting in early failure of the tanks and accompanying safety hazards and loss of economy. Furthermore, there is a substantial difference in the thermal coefficients of expansion between the plastic liner and metallic tank often causing rupture of the bond between the liner and tank, resulting in tearing or splitting of the lining, which can also occur by a physical blow to the outside of the metallic tank.

Tanks having the bladder-type linings have not been satisfactory in many applications due to the relative ease of damaging the thin, flexible bladder during filling, handling and cleaning.

After considerable research and experimentation, the polyolefin lined tank of the present invention has been devised to overcome the disadvantages experienced with the above-mentioned lined tanks, and comprises, essentially, a rigid polyolefin tank mounted within a metallic tank wherein there is no adherence or bonding between the walls of the inner polyolefin tank and the outer metallic tank, whereby damage to the tank through thermal expansion and contraction is prevented since the inner polyolefin tank and outer metallic tank are free to expand and contract independently of each other. Furthermore, by having no adherence between the walls of the inner polyolefin tank and the outer metallic tank, damage to the inner tank by a physical blow to the outer metallic tank is minimized.

The polyolefin tank is fabricated within the metallic tank by a state-of-the-art rotational molding technique wherein a high temperature paint or other suitable release agent is first applied to the inner walls of the metallic tank, and then polyolefin powder is placed in the metallic tank which has been pre-heated. The polyolefin melts during rotation of the continuously heated tank to thereby coat the inner walls of the tank. The tank is then cooled, resulting in shrinkage of the polyolefin away from the metallic walls. During the cooling cycle, the interior of the vessel is pressurized to control the shrinkage, resulting in minimum clearance between the outer and inner tanks, and stress relief of the inner polyolefin tank. Thus, a polyolefin tank within a metallic tank is provided wherein the polyolefin tank is continuously molded, resulting in a seamless vessel of uniform thickness, free of voids or cracks. By using state-of-the art rotational molding techniques, the thickness of the inner polyolefin tank can be controlled to provide a heavy walled, rigid vessel, possessing mechanical strength and durability superior to thin flexible linings.

Fixtures are attached to the flanges of the fittings of the metallic tank to allow the polyolefin to flow through the metallic tank fittings to thereby coat the outer surfaces of the metallic tank flanges. Thus, the complete neck and flange are formed on the inner polyolefin tank during the rotational molding process, thereby precluding the necessity for weldments, bonds, or seams to attach or finish the flange. This permits the inner tank's flanges to be sealed between the outer tank's flanges and polyolefin lined closures, assuring the integrity of product containment entirely within the inner polyolefin tank.

BRIEF DESCRIPTION OF THE DRAWINGS

FIG. 1 is a sectional, side elevational view of the finished polyolefin tank within a metallic tank;

FIG. 1a is an enlarged sectional view along line 1a—1a of FIG. 1;

FIG. 2 is a side elevational view of the first step in the method of making the finished tank wherein fixtures are connected to the flanges of the metallic tank fittings;

FIGS. 4 and 5 are fragmentary, sectional side elevational views showing the flow of polyolefin through the metallic tank fittings during the rotational molding step:

DESCRIPTION OF THE PREFERRED EMBODIMENT

Figure 3:
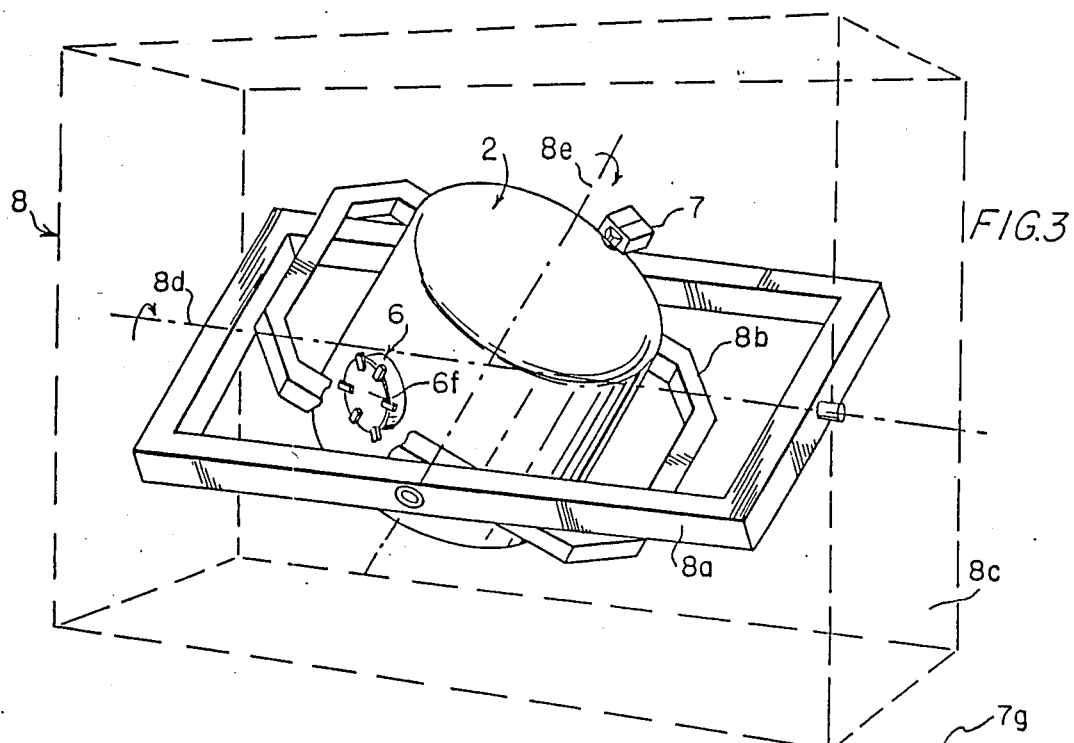
FIG. 3 is a perspective view of the metallic tank mounted in a rotational molding apparatus.

Referring to the drawings and more particularly to FIG. 1 thereof, the polyolefin lined metallic tank 1 of the present invention comprises a conventional marine portable metallic tank 2 having a flanged manway fitting 3, and a flanged outlet fitting 4. A rigid polyolefin tank 5 of linear low density polyolefin, such as DOWLEX Resin 2476 manufactured by The Dow Chemical Company is contained within the metallic tank 2 wherein there is no adherence or bonding between the inner wall surfaces of the metallic tank 2 and the outer wall surfaces of the polyolefin tank 5, as shown in FIG. 1a, to thereby provide the polyolefin tank within a metallic tank. A maximum clearance of 0.04 inch, 5a, between the inner wall of the outer tank 2 and the outer wall of the inner tank 5 is obtained, which minimizes relative movement and stresses between the tanks due to inertial forces. By the construction and arrangement of the polyolefin tank 5 within the metallic tank 2, damage to the tank 1 through thermal expansion and contraction is prevented since the inner polyolefin tank 5 and outer metallic tank 2 are free to expand and contract independently of each other. Furthermore, by having no adherence between the walls of the inner polyolefin tank 5 and the outer metallic tank 2, damage to the inner tank by a physical blow to the outer metallic tank is minimized.

In the fabrication of the tank-within-a-tank of the present invention, adapters or fixtures 6 and 7 are provided for closing the manway fitting 3 and flanged outlet fitting 4, respectively. As will be seen in FIGS. 2 and 4, the fixture 6 for closing the manway fitting 3 comprises a pair of semi-circular collars 6a having a vertical wall 6b and a horizontal bottom wall 6c, the inner peripheral edge of which is adapted to sealingly engage the outer peripheral edge surface 3a of the manway fitting flange 3, as shown in FIG. 4. A semi-circular ring 6d is secured to the bottom face of the horizontal wall 6c and is adapted to sealingly engage the underside surface 3b of the manway fitting flange 3. The semi-circular collars 6a are bolted together through mating brackets 6g and held in position by clips 6e welded to the outer vertical surface of the manway 3, such that the upper surface of the ring 6d sealingly engages the underside 3b of the manway flange, whereby the upper surface 3c of the manway flange 3 and the horizontal wall 6c of the fixture 6 form a horizontal plane. A cover plate 6f is bolted to the fixture assembly through brackets 6h secured to the vertical wall 6b to seal the opening.

A similar fixture 7 is provided for the flanged outlet fitting 4 except that in lieu of a separate cover, each collar 7a has a top wall portion 7f integrally connected to the wall portion 7b. The collars 7a are bolted together through brackets 7g and held in position by clips 7e welded to the horizontal surface of the outlet fitting 4, so that when the ring member 7d is held sealingly engaged to the lower surface 4b of the flange of fitting 4 by the welded clips 7e, the top wall portions 7f are brought together to form a continuous closure for the fixture 7, whereby the outer surface 4c of the outlet flange 4 and the vertical wall 7c of the fixture form a vertical plane.

Figure 5:
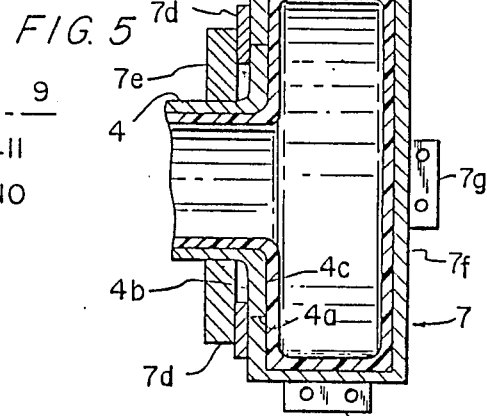

In the method of forming the polyolefin tank 5 within the metallic tank 2, a high temperature paint or other suitable release agent is first applied to the inner walls of the metallic tank. The metallic tank 2 is then mounted in a conventional rotational molding apparatus 8, as shown in FIG. 3, which includes frames 8a, 8b rotatably mounted within an oven 8c along axis 8d and 8e, respectively. Fixture 6, except for cover plate 6f, is connected to the manway fitting 3 and the fixture 7 is connected to the outlet fitting 4. The metallic tank is then pre-heated for approximately one hour to eliminate cold spots in the tank walls. After the pre-heat cycle, a polyolefin such as DOWLEX Resin 2476 manufactured by The Dow Chemical Company is introduced, in powder form, into the tank 2 through the manway fitting 3, and the fitting is then closed by the cover plate 6f. The tank 2 is then rotated and heated for approximately 45 to 50 minutes at 300° F. During the heating cycle, the polyolefin is transformed from the powdered state to a semi-solid gel state. The polyolefin remains at the bottom or lowest surface of the tank 2 during its rotation and as the hot surface of the tank 2 passes through the resin powder, a small amount of the polyolefin will melt and stick to the inner wall surface of the tank 2, whereby continuous rotation of the tank 2 about axis 8e and 8d results in a build-up of polyolefin not only on the tank wall, but also in the necks of the tank fittings 3, 4 and in the fixtures 6 and 7 as shown in FIGS. 4 and 5.

After the heating cycle is completed, the outer tank 2 is water cooled to set the polyolefin within the tank 5 while the tank is continuously rotated for approximately 1 to 1-½ hours. The cooling cycle results in a 1-½% to 2% shrinkage of the polyolefin away from the metallic tank walls. To control the shrinkage of the polyolefin during the cooling cycle, air pressure is introduced into the inner tank. Upon solidification of the polyolefin, water cooling and rotation are terminated but air pressure is maintained within the inner tank for an additional 4-½ to 5 hours, at which time the vessel has cooled to ambient temperature. The result is a rigid polyolefin tank 5 within the metallic tank 2 wherein there is no adherence or bonding between the inner wall surfaces of the metallic tank 2 and the outer wall surfaces of the polyolefin tank 5, and between which surfaces a minimum separation (0.04 inch maximum) is achieved. Maintenance of the air pressure also relieves all stresses in the inner tank, which otherwise would have occurred at points of curvature during the cooling cycle.

Figure 6:
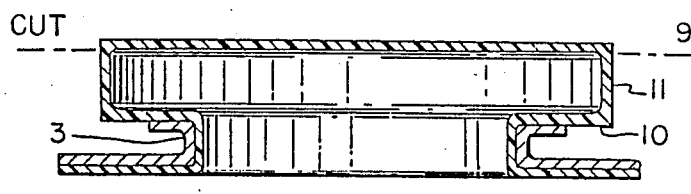
FIGS. 6 and 7 are fragmentary, sectional side elevational views of the vessel fittings wherein the fixtures have been removed.
Figure 6A:
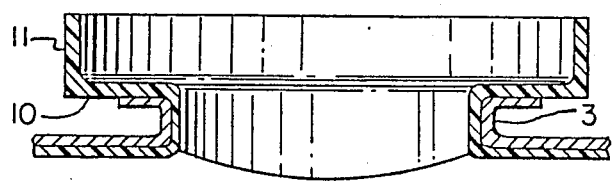
FIGS. 6a and 7a are fragmentary, sectional side elevational views of the completed fittings following cutting and trimming of the polyolefin.
Figure 7A:
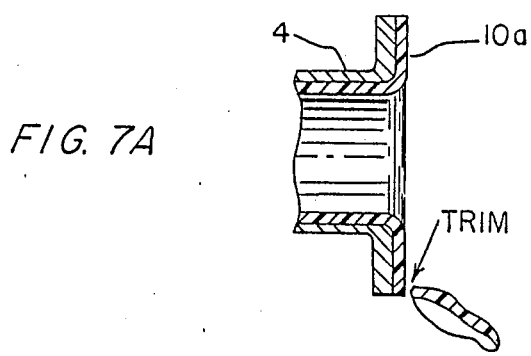
Figure 7:
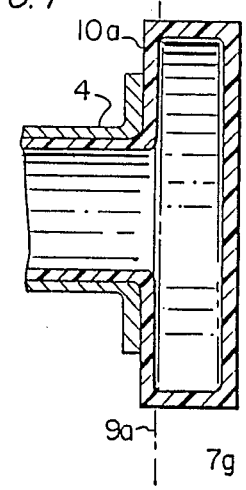

To complete the fabrication of the tank-within-a-tank, the assembly is removed from the rotational molding apparatus 8, and the fixtures 6 and 7 are removed from their respective fittings 3 and 4, as shown in FIGS. 6 and 7, and the welded clips 6e and 7e are removed. The polyolefin is cut along a plane 9 parallel to the flange surface of the fitting 3, resulting in a cup-shaped projection of polyolefin, integral to the inner tank 5, having a horizontal surface 10 which is parallel to, projecting beyond and contacting, without adherence, the flange of the tank fitting 3, and having a continuously formed vertical wall 11, as shown in FIG. 6a. This cup-shaped form reduces the probability of spillage of liquids on the outer surface of the outer tank 2 when filling the vessel. Closure of this fitting is attained by a circular steel plate 12 (FIG. 1) having a diameter equal to that of the flange of fitting 3, to one surface of which is adhering thereto a polyolefin plate 13 of equal diameter. This plate is secured to the flange of the fitting 3 through the polyolefin wall 10 by bolting through corresponding holes in the conventional manner of a blind flange closure.

The polyolefin is cut along a plane 9a parallel to the flange surface of the fitting 4 as shown in FIG. 7, resulting in a polyolefin flange 10a which is parallel to and contacting, without adherence, the flange of the fitting 4. The excess projection of the polyolefin flange 10a is trimmed to conform to the diameter of the flange of the fitting 4, as shown in FIG. 7a. Closure is made in the same manner as previously described for the fitting From the above description, it will be appreciated by those skilled in the art that by employing a state-of-the-art rotational molding technique, the thickness of the inner polyolefin tank can be controlled to provide a heavy walled, rigid, seamless vessel, free of voids or cracks and possessing mechanical strength and durability. The use of the fixtures 6 and 7 allow the polyolefin to flow through the necks of the tank fittings 3 and 4 during the rotational molding process whereby the outer surfaces of the metallic tank flanges are covered with polyolefin, thereby permitting the inner tank flanges 10 and 10a to be sealed between the flanges of the tank fittings 3 and 4 and polyolefin coated closures, assuring the integrity of product containment entirely within the inner polyolefin tank 5.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A fixture closing the flanged fitting of a metallic tank when forming a rigid polyolefin tank within the metallic tank by a rotational molding technique, said flange having an outer peripheral edge, comprising a pair of semi-circular collars having a side wall and a bottom wall, said bottom wall having an inner face and an outer face, the bottom wall of each collar having an inner peripheral edge engaging the outer peripheral edge of the metallic tank fitting flange to provide a continuous surface for the flow of polyolefin during the molding process, a semi-circular ring member secured to the outer face of the bottom wall adjacent to the inner peripheral edge portion thereof, a portion of one face of said semi-circular ring member sealingly engaging the underside surface of the metallic tank flange and extending across the peripheral edges of said collars and flange, and a bolt assembly clamping the semi-circular collars together on the flange of said fitting to form a continuous collar around said fittings.

2. A fixture according to claim 1, wherein a removable cover plate is secured to the top edge of the side wall.

3. A fixture according to claim 1, wherein each collar has a top wall portion integrally connected to the side wall, whereby when the collars are clamped to the flanged fitting the top wall portions are brought together to form a continuous closure.

4. A fixture according to claim 1, wherein a removable clip member is secured to the flanged fitting neck and engages a portion of the opposite face of said semi-circular ring member, whereby the semi-circular ring members maintain the flanged surface of the fittings and the bottom walls of the semi-circular collars in coplanar relationship.

* * * * *